June 24, 1958 A. GORDON Re. 24,492

SUPPORTING HANGER FOR A CLOSET BOWL

Original Filed April 14, 1953 2 Sheets-Sheet 1

INVENTOR.
Arthur Gordon
BY
Schroeder, Mariam, Hofgren & Brady Attys.

SUPPORTING HANGER FOR A CLOSET BOWL

Original Filed April 14, 1953 2 Sheets-Sheet 2

INVENTOR.
Arthur Gordon
BY
Schlender, Merriam, Hoffman & Brady Attys.

United States Patent Office

Re. 24,492
Reissued June 24, 1958

24,492

SUPPORTING HANGER FOR A CLOSET BOWL

Arthur Gordon, deceased, late of Chicago, Ill., by Gerda E. Gordon, executrix, Chicago Ill.

Original No. 2,688,755, dated September 14, 1954, Serial No. 348,668, April 14, 1953. Application for reissue August 29, 1956, Serial No. 606,943

7 Claims. (Cl. 4—252)

Matter enclosed in heavy brackets [ ] appears in the original patent but forms no part of this reissue specification; matter printed in italics indicates the additions made by reissue.

This invention relates to supporting hangers, and more particularly to a supporting hanger for securing a closet bowl upon a wall. The primary object of the present invention is to provide a simple and secure mounting surface for supporting a closet bowl on a wall.

Another object is to provide a supporting hanger capable of vertical adjustment to accommodate itself to variations in the outlets of closet bowls.

A further object is to provide a supporting hanger capable of being employed in upright or inverted position on the same side of a wall as the closet bowl is to be mounted.

Another object is to provide an inexpensive supporting hanger capable of being employed with either a blowout type or a syphon jet type of closet bowl.

The invention is illustrated in the preferred embodiment in the accompanying drawings, in which.

While the invention is susceptible of various modifications and alternative constructions, it is herein shown and will hereinafter be described in a preferred embodiment. It is not intended, however, that the invention is to be limited thereby to the specific construction disclosed. On the contrary, it is intended to cover all modifications and alternative constructions falling within the spirit and scope of the invention as defined in the appended claims.

Figure 1:
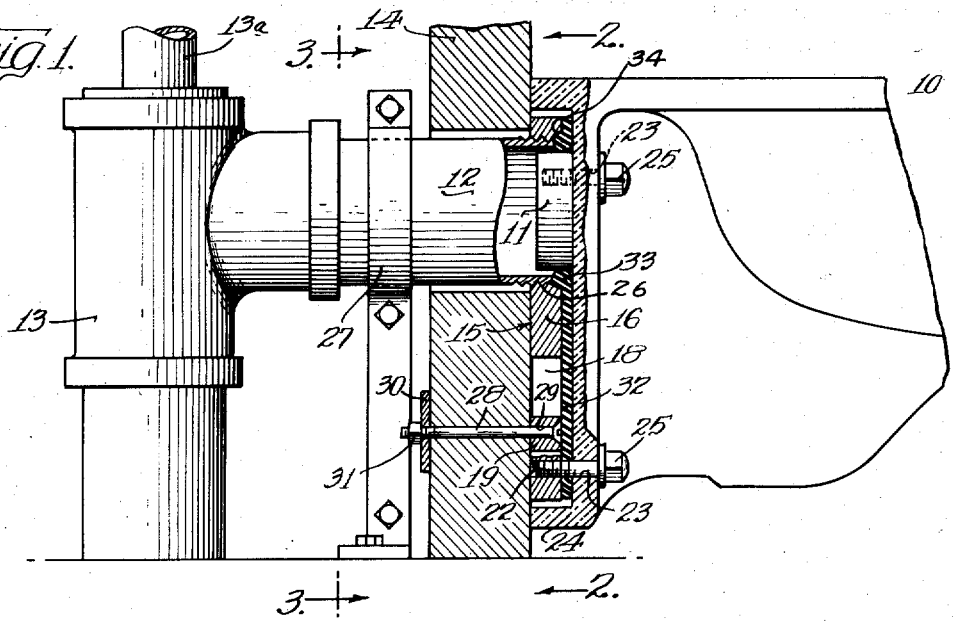
Fig. 1 is a fragmentary elevational view, partly in section, showing the invention in use with a blowout type closet bowl.
Figure 2:
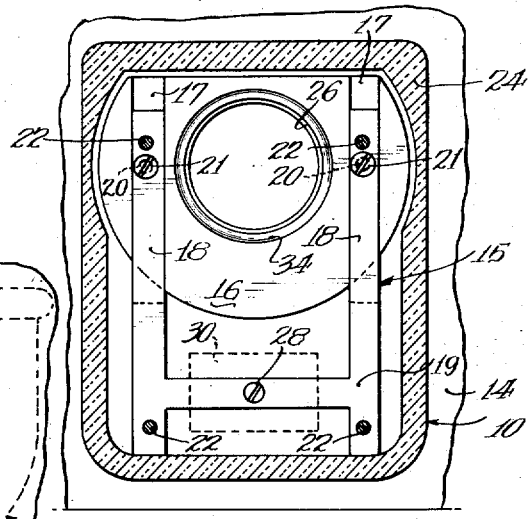
Fig. 2 is a sectional view taken on line 2—2 of Fig. 1.
Figure 3:
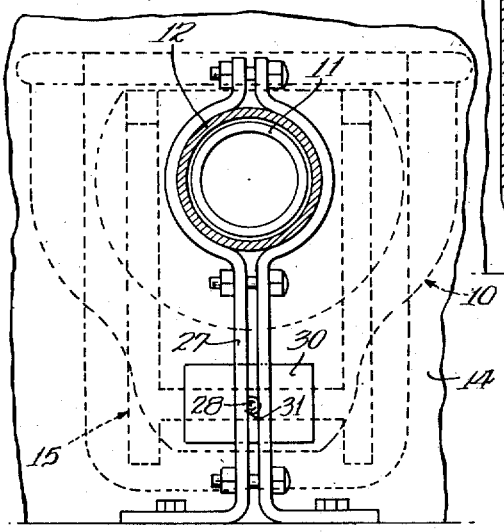
Fig. 3 is a sectional view taken on line 3—3 of Fig. 1.
Figure 4:
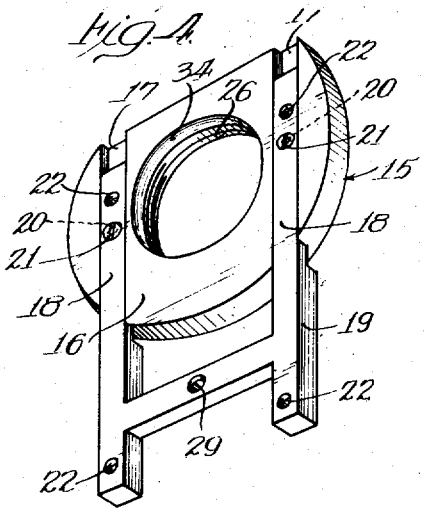
Fig. 4 is a perspective view of the supporting hanger.
Figure 5:
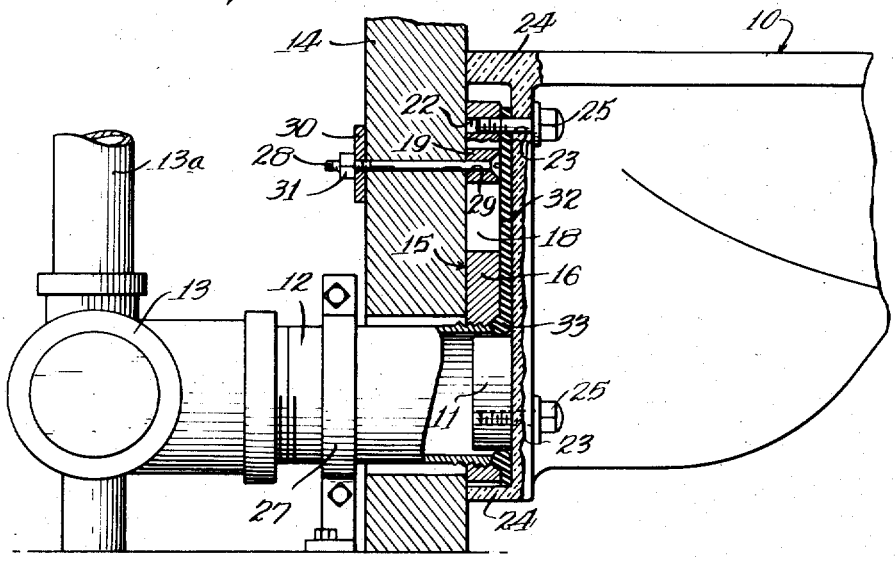
Fig. 5 is a fragmentary elevational view, partly in section, of the invention as used with a syphon jet type closet bowl.

In the embodiment illustrated, two general types of closet bowls, generally designated 10, are shown, the blowout type in Fig. 1, and the siphon jet type in Fig. 5. Both are adapted for wall mounting, and empty through an outlet 11 in the bowl into an extension 12 of a waste pipe 13. The vent pipe 13a carries away fumes and odors from the waste pipe.

These closet bowls described are spaced a sufficient distance from the floor to facilitate cleaning beneath them. The importance of the cleanliness feature is amply magnified in most public rest rooms in schools, buildings and factories, and such places are now using, or are now turning to, closet bowls capable of wall mounting.

The present invention is important in facilitating installation of closet bowls of the type described above, whether such installation be in old buildings being changed, or in new structures being erected. It provides a mounting surface, securely attached to the waste pipe extension 12 on the same side of a wall 14 as is the closet bowl to be secured. Manufacturers of prior art devices have found it necessary to place a mounting surface on the opposite side of the wall from the closet bowl to gain the necessary supporting strength. Obviously this makes it more difficult to register supporting bolts in their proper recesses, and access to the devices after installation is impossible without completely tearing out the intervening wall. In addition, these devices have been very complicated structurally and are much more expensive to manufacture than the present invention.

As herein shown, the mounting surface comprises a supporting hanger, generally designated 15, which includes a plate 16 having channels 17 to receive therein a pair of integral arms 18 of a mounting bracket 19. The mounting bracket 19 is capable of adjustment upon the plate 16. A succession of threaded recesses, not shown, within each of the grooved surfaces 17 may be made to coincide with the pair of openings 20 in the arms 18 as the mounting bracket is slid back and forth in the grooved surfaces. The bolts 21 inserted into these coinciding openings lock the mounting bracket upon the plate in adjusted position.

This simple adjustable feature is of particular importance in those cases in which the closet bowl outlets vary slightly from their normal position. The solution to this problem is made easy by the present invention. The outlet 11 is merely inserted within the waste pipe extension 12, and the positions of the threaded recesses 22 in the mounting bracket are compared with the positions of the apertures 23 in the flange 24 of the closet bowl. The bowl is next removed, and the mounting bracket adjusted to bring recesses 22 and apertures 23 into coincidence. Finally the bolts 25 are inserted through the apertures into the recesses to secure the closet bowl upon the supporting hanger 15.

Many convenient means for attaching the supporting hanger to the waste pipe extension suggest themselves. In the embodiment shown, the central aperture 26 of the plate 16 is threadably engaged upon the exposed end of the waste pipe extension 12 which places the supporting hanger 15 flush with the wall 14. Added support may be given to the extension 12 by a supporting bracket 27 on the side of the wall opposite the closet bowl.

It is sometimes desirable to secure the supporting hanger 15 further by a support bolt 28 which passes through an opening 29 in the mounting bracket 19, and secures an anchor plate 30 against the side of the wall opposite the closet bowl by a nut 31. This arrangement eases the downward force exerted upon the waste pipe extension.

A gasket 32 covers the outer face of the supporting hanger 15. Leakage at the point where the closet bowl outlet joins the waste pipe extension is prevented by a rib 33 on the gasket. The rib is shaped to fit into a beveled edge 34 about the central aperture 26 in the plate 16. The gasket is brought into sealing engagement with the supporting hanger 15 and the closet bowl 10 by advancing the bolts 25 into the threaded recesses 22. When the closet bowl is in position on the wall, the flange 24 covers the supporting hanger and hides it from view.

As can be seen in Fig. 5, the supporting hanger is also adapted for use with the siphon jet type closet bowl, by merely inverting its operating position above described. It is equally as easy to adjust the hanger for this type bowl as with the type shown in Fig. 1. If a supporting bracket 27 is to be again used, it is of course necessary to alter its height to suit the occasion. Except for this slight alteration, precisely the same structure may be employed for either type of closet bowl.

The simplicity of the present structure gives it another important advantage over supports of the prior art. Its use necessitates only a single joint between the closet bowl and the waste pipe 13 or its extension 12. Supports now in use provide a plurality of such joints, sometimes as high as four or five, because of the complicated nature of their supporting structure. An increase in joints, of course, increases the possibility of leakage with its accompanying damage to the building structure. Furthermore, the proper installation of these supports requires a great many more man hours than does the installation of the present invention.

[I claim] *The following is claimed:*

1. In a wall supported closet bowl with a waste pipe extension projecting through the wall to the side on which the closet bowl is to be mounted, a supporting hanger for securing the bowl to the wall comprising a first member rigidly attached to and supported by the waste pipe extension and having an opening therethrough, said member being mounted with its opening in surrounding relation to the waste pipe extension and having one face bearing against that side of the wall on which the bowl is to be hung; and a second member having anchored therein, to the exclusion of said first member, all of the means by which the bowl is fixedly attached to the supporting hanger, said second member being vertically adjustably secured to said first member and also bearing over part of its area against the wall on which the bowl is to be hung.

2. In a wall supported closet bowl with a waste pipe extension projecting through the wall to the side on which a closet bowl is to be mounted, a supporting hanger for securing the bowl to the wall comprising a first member rigidly attached to and supported by the waste pipe extension and having an opening therethrough, said member being mounted with its opening in surrounding relation to the waste pipe extension and having one face bearing against that side of the wall on which the bowl is to be hung; a bowl supporting member secured to said first member for vertical adjustment relative thereto and also bearing over part of its area against the wall on which the bowl is to be hung; and means for attaching the bowl to the hanger having engagement with said bowl supporting member to the exclusion of said first member.

3. In a wall supported bowl with a waste pipe extension projecting through the wall to the side on which the bowl is to be mounted, a supporting hanger for securing the bowl to the wall comprising a plate-like member rigidly attached to and supported by the waste pipe extension spaced above the base of the wall on which the bowl is secured, said member having an opening therethrough and being mounted with its opening in surrounding relation to the waste pipe extension and having one face bearing against that side of the wall on which the bowl is to be hung; and bowl supporting means having anchored therein to the exclusion of said plate-like member all of the means by which the bowl is fixedly attached to the supporting hanger, said bowl supporting means being vertically adjustably secured to said plate-like member spaced upwardly from the base of the wall and also bearing over part of its area against the wall on which the bowl is to be hung.

4. In a support for a baseless closet bowl with a waste pipe extension projecting through the wall to the side on which the closet bowl is to be mounted, a supporting hanger for the bowl comprising a first member having an opening for the projection therethrough of the waste pipe extension, said member being mounted with its opening in surrounding relation to the waste pipe extension and being secured thereto, a bowl supporting member adjustable vertically relative to said first member and to the opening therein, and means for attaching the bowl to the hanger having engagement with said bowl supporting member to the exclusion of said first member.

5. A supporting hanger according to claim 1, in which said first member has parallel channels formed in the face thereof and in which said second member has arms receivable slidably within the channels in said first member and means for anchoring said second member to the wall as well as to said first member.

*6. For combination with a closet bowl having an outlet and an apertured flange around the outlet and a waste pipe extension projecting through a wall to terminate on the side on which the closet bowl is to be mounted, a member supporting the waste pipe extension closely adjacent the side of the wall opposite that on which the closet bowl is to be mounted, and a hanger for supporting the closet bowl to the exclusion of said member, said hanger including a plate-like member removably, fixedly secured to the waste pipe extension at the end thereof on the side of the wall on which the closet bowl is to be mounted and having an opening co-axially of the extension, a bracket adjustably associated with the plate-like member to permit arrangement of the hanger in registration with the bowl outlet and apertured flange, and releasable means for securing the bracket to the plate-like member in such arrangement, whereby suitable securing means may be associated with the flange and hanger for supporting the closet bowl from said plate-like member with its outlet in alignment with the waste pipe extension, said plate-like member and adjustable means being relatively thin and arranged to be received within the closet bowl.*

*7. For use with a closet bowl having an outlet and an apertured flange around the outlet and a waste pipe extension projecting through a wall to terminate on the side on which the closet bowl is to be mounted, a member supporting the waste pipe extension closely adjacent the side of the wall opposite that on which the closet bowl is to be mounted, and a hanger for supporting the closet bowl to the exclusion of said member, said hanger including a plate-like member removably, fixedly secured to the waste pipe extension at the end thereof on the side of the wall on which the closet bowl is to be mounted to bear against the wall and having an opening co-axially of the extension, bracket adjustably associated with the plate-like member to permit arrangement of the hanger in registration with the bowl outlet and apertured flange, and releasable means for securing the bracket to the plate-like member in such arrangement, whereby suitable securing means may be associated with the flange and hanger for supporting the closet bowl from said plate-like member with its outlet in alignment with the waste pipe extension.*

References Cited in the file of this patent or the original patent

UNITED STATES PATENTS

| | | |
|---|---|---|
| 1,040,823 | Watrous | Oct. 8, 1912 |
| 1,212,280 | Stringer | Jan. 16, 1917 |
| 1,242,572 | Mann | Oct. 9, 1917 |
| 1,335,056 | Hinsdale | Mar. 20, 1920 |
| 1,410,526 | Bennett | Mar. 21, 1922 |
| 1,473,439 | Marsh | Nov. 6, 1923 |
| 1,946,140 | Heinkel | Feb. 6, 1934 |
| 1,961,818 | Deacon | June 5, 1934 |
| 1,970,707 | Riddell | Aug. 21, 1934 |
| 2,159,021 | Groeniger | May 23, 1939 |